United States Patent [19]

Saito et al.

[11] Patent Number: 4,937,673
[45] Date of Patent: Jun. 26, 1990

[54] CAMERA FOR SHOOTING MOVIE AND STILL PICTURES WHILE PREVENTING NOISE FROM BEING RECORDED

[75] Inventors: Akira Saito; Toshiharu Iida; Akio Serizawa; Tatuo Inoue, all of Tokyo, Japan

[73] Assignees: Fuji Photo Film Co., Ltd., Kanagawa; Sony Corporation, Tokyo, both of Japan

[21] Appl. No.: 176,754

[22] Filed: Apr. 1, 1988

[30] Foreign Application Priority Data

Apr. 3, 1987 [JP] Japan ............... 62-80981

[51] Int. Cl.⁵ .............................. H04N 3/14
[52] U.S. Cl. .................... 358/209; 358/909; 358/906
[58] Field of Search ............ 358/909, 213.13, 906, 358/335, 345, 348, 225, 209; 360/79, 33.1

[56] References Cited

U.S. PATENT DOCUMENTS

| | | | |
|---|---|---|---|
| 2,698,356 | 12/1954 | Roos | 178/6.8 |
| 3,546,378 | 12/1970 | Karikawa | 178/7.1 |
| 3,826,567 | 7/1974 | Vockenhuber et al. | 352/137 |
| 4,281,911 | 8/1981 | Engelsmann et al. | 354/173.1 |
| 4,714,962 | 12/1987 | Levine | 358/909 |
| 4,716,470 | 12/1987 | Levine | 358/909 |
| 4,755,885 | 7/1988 | Okino et al. | 358/906 |

FOREIGN PATENT DOCUMENTS

| | | |
|---|---|---|
| 1111665 | 7/1961 | Fed. Rep. of Germany . |
| 106089 | 5/1974 | German Democratic Rep. . |
| 2144009 | 2/1985 | United Kingdom . |

*Primary Examiner*—Jin F. Ng
*Assistant Examiner*—Stephen Brinich

[57] ABSTRACT

A camera has a video camera unit to shoot a movie picture and a still camera unit to shoot a still picture so as to allow movie and still pictures to be taken simultaneously. The camera is provided with mechanism to automatically wind or rewind a film installed in the still camera unit. While a movie picture shooting operation is taking place, the camera disables the film wind and rewind operations so as to prevent the noise due to the film wind or rewind operation from being recorded in the video camera unit.

3 Claims, 3 Drawing Sheets

CAMERA FOR SHOOTING MOVIE AND STILL PICTURES WHILE PREVENTING NOISE FROM BEING RECORDED

BACKGROUND OF THE INVENTION

1. Field of the Invention

The present invention relates to a camera for shooting a movie picture and a still picture, and in particular, to a camera having a function of a still camera recording a still picture on a silver-halide type of photographic film and a function of a video camera recording a movie picture on a video tape.

2. Description of the Prior Art

There has been a requirement to record a particular scene in the form of a still picture while shooting an object scene by a television camera having a function to record a movie picture on a video tape, so called video camera.

Conventionally, a still camera using a silver-halide type of photographic film and a separate video camera using a video tape are used in such a case where when a scene suitable for a still picture appears during a shooting of the video camera, the operation of the video camera is interrupted to take the still picture by use of the still camera. Consequently, even when the same scene is desired to be shot by the video camera and the still camera, the shooting operation can be achieved only by one of these cameras at a time. Namely, an important shooting chance could be lost and two cameras must be used, which leads to a disadvantage with respect to portability.

To solve the problems above, a camera for shooting a movie picture and a still picture configured in a single unit including a combination of a still camera and a video camera such that a still picture can be taken through an operation of the still camera without interrupting the shooting operation of the video camera has become desirable.

In such a camera, for each however, shooting of the still camera, a film for shooting the still picture must be manually wound; and when the shooting operation is completed, the film must be manually wound back or rewound. It would be desirable and advantageous for such cameras to include a so-called automatic wind and rewind function so as to automatically effect the wind and rewind operations.

However, in an apparatus having such automatic wind and rewind functions, during a movie picture operation of the video camera, the film of the still camera might, for some reason or another automatically wind or rewind; consequently, the sound caused by the winding or rewinding operation would be recorded as noise on the video tape, which leads to an undesirable result in that an uncontaminated recording of a movie picture cannot be obtained.

SUMMARY OF THE INVENTION

It is therefore an object of the present invention to provide a camera for shooting a movie picture and a still picture effecting automatic wind and rewind operations of a film in a still camera unit which prevents the noise of the wind or rewind operation of the film in the still camera unit from being recorded as a noise during a movie shooting by a video camera unit, thereby removing the problems of the prior ar technology.

According to the present invention, there is provided a camera for shooting a movie picture and a still picture comprising a still camera unit for shooting an object scene to record a still picture thereof on a film and a video camera unit for shooting an object scene to record a movie picture thereof on a video tape. The camera includes film drive means for automatically driving the film in the still camera unit. Furthermore, the camera comprises control means for controlling an operation of the film drive means during an operation of the video camera unit. The control means stops a driving operation of the film by the film drive means while the video camera unit is taking a movie picture.

Incidentally, the term "a camera for shooting a movie picture and a still picture" in this specification is to be broadly interpreted as an imaging apparatus having both a function of a still camera and a function of a video camera regardless of whether or not the still camera unit and the video camera unit are incorporated into a housing, whether or not the still and video camera units are respectively contained in independent cabinets, whether or not the still and video camera units are separable when both of the units are respectively contained in independent cabinets, and whether or not the still and video camera units can be independently used when both units are separable.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, a detailed description will be given of embodiments of a camera for shooting a movie picture and a still picture according to the present invention.

Figure 1A:
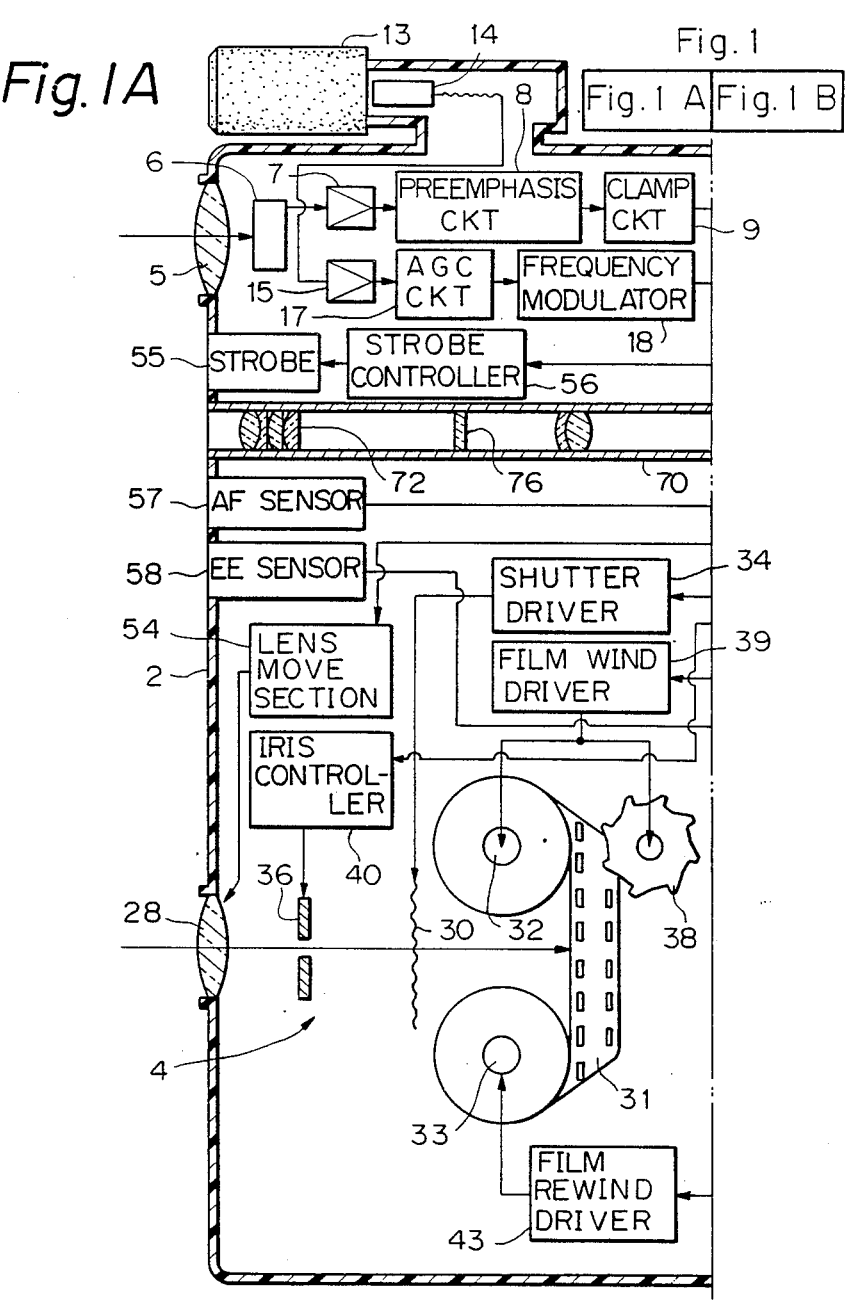
FIGS. 1A–1B, when combined as shown in FIG. 1, are schematic configuration diagrams of an embodiment of a camera for shooting a movie picture and a still picture according to the present invention.
Figure 1B:
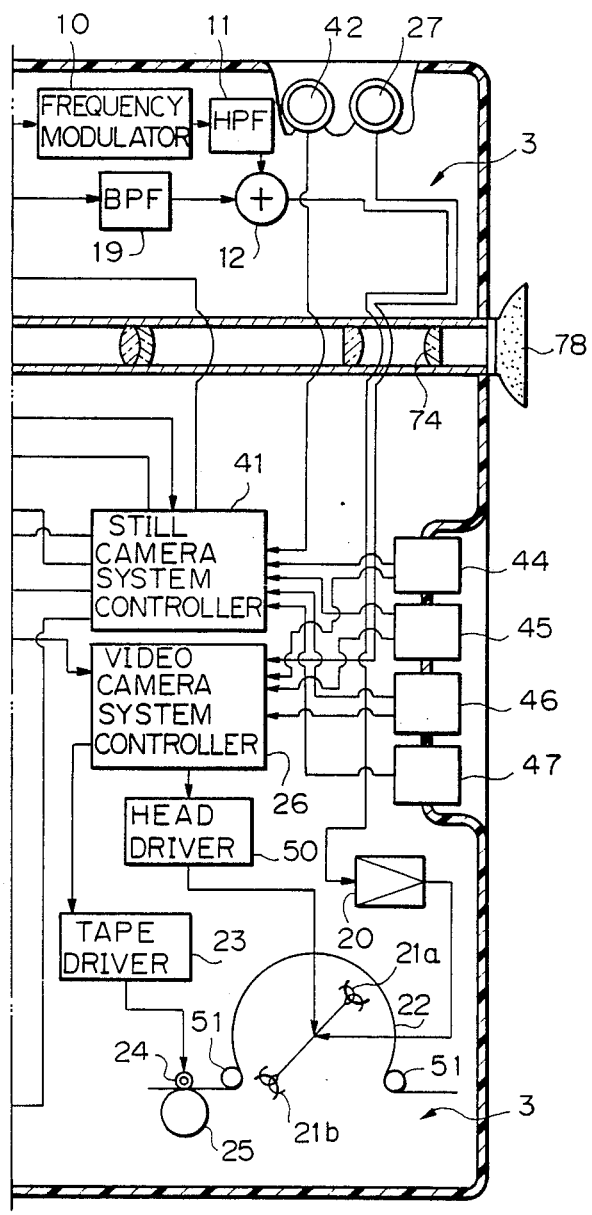
Figure 2:
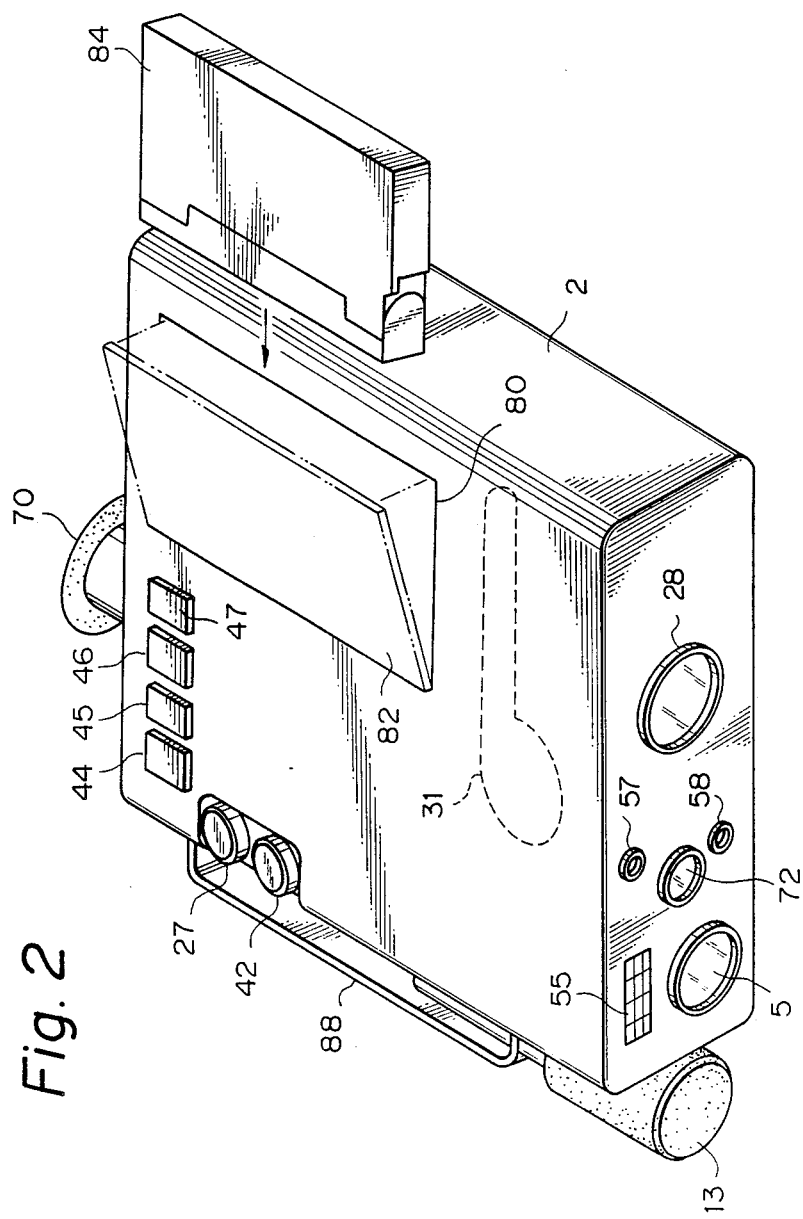
FIG. 2 is a perspective view of an appearance of the apparatus of FIGS. 1A–1B.

As shown in FIGS. 1A–1B and 2, a camera of the embodiment comprises a body 2 containing a video camera unit 3 and a still camera unit 4.

The video camera unit 3 employs a so-called 8 millimeter (mm) cassette video tape as a video recording medium, and has a movie shooting function of shooting an image of an object received through a lens so as to record a movie picture thereof in the form of a video signal on the video tape.

The still camera unit 4 in the embodiment has a still camera of the 135 type using a 135-type silver-halide type of photographic film as a still recording medium. Incidentally, the still camera unit may be one having a 110-type still camera function which employs a 110-type cartridge silver-halide type of photographic film as the still recording medium.

As shown in FIG. 2, according to the embodiment, the body 2 is formed as a housing or a cabinet substantially in a book shape including an upper surface and a bottom surface each being greater than other surfaces so as to contain the video camera unit 3 and the still camera unit 4. On the upper surface of the body 2, there is disposed a cassette storage 80. When a video cassette 84 is stored therein, a cassette store cap 82 is opened upward in an inclined direction so as to install the video cassette 84 through an opening thereof.

In front of the body 2, there are arranged a master lens 28, an objective lens 72 of an optical view finder 70, an automatic focus (AF) sensor 57, and an automatic iris control (EE) sensor 58 respectively of the still camera unit 4, and a master lens 5 and a strobe light 55 of the video camera unit 3. Furthermore, on an external side of the body 2, there is disposed a microphone 13 of the video camera unit 3 and a handgrip 88. On the rear side of the body 2, there are arranged an ocular lens 74 and an eye cup 78 of the optical view finder 70; moreover, a record button 27, a strobe ON/OFF button 44, and other operation buttons 45-47 of the video camera unit 3 are arranged in a location near the rear side of the upper surface of the body 2.

In addition, as denoted by a dotted line in FIG. 2, a 135-type silver-halide type of photographic film 31 is installed in a position on the rear side of the master lens 28 of the body 2. The silver-halide type of photographic film 31 is loaded, for example, in the following fashion. When the cap member in front of the body 2 is inclined so as to form an opening, not shown, in a portion of the upper surface of the film store chamber indicated by the dotted line in FIG. 2, the 135-type film 31 is loaded through this opening.

An imaging optical system of the video camera unit 3 includes a master lens 5 mounted in a front surface of the body 2 and the master lens 5 is followed by a charge coupled device (CCD) 6 transducing an optical image of an object scene focused by the master lens 5 from an optical signal into a video signal. The video signal thus attained by the CCD 6 is fed to a circuit of an image processing system.

The circuit associated with the image processing system includes an amplifier 7 for amplifying the video signal from the CCD 6, a preemphasis circuit 8 for emphasizing a high-frequency component of the signal fed from the amplifier 7 for an improvement of the signal-to-noise (SN) ratio of a reproduced signal, a clamp circuit 9 for fixing a level of a waveform of a signal delivered from the preemphasis circuit 8 so as to retain a relationship between the video signal waveform and the carrier frequency by means of a frequency modulator 10, which transforms the video signal from the clamp circuit 9 into a recording signal suitable for a recording thereof on a magnetic tape 22, and a high-pass filter, HPF 11 for removing from an output signal from the frequency modulator 10 a low-frequency conversion color signal, not shown, and a frequency band of a sound signal to be described later.

The signal produced from the high-pass filter 11 is supplied to a mixer 12 for a multiplexing of a sound signal. Incidentally, for the preemphasis circuit 8 and the clamp circuit 9, those employed in the known recording circuit of a video tape recorder may be used.

In addition, a sound caught by the microphone 13 disposed at an external position of the body 2 is converted into a sound signal by a microcapsule 14 and is then fed to a circuit of a sound signal recording system.

The circuit associated with the sound signal recording system includes, as shown in the figure, amplifier 15 for amplifying the sound signal from the microcapsule 14. The amplifier 15 produces an output to be supplied to an auto gain control, AGC, circuit 17, which automatically adjusts an input level of the sound signal when the input level is not at a predetermined value. An output produced from the AGC circuit 17 is delivered to a frequency modulator 18.

The frequency modulator 18 converts the sound signal from the AGC circuit 17 into a recording signal suitable for a recording thereof on the magnetic tape 22. The band-pass filter 19 is provided only to pass signals in a frequency band range between a frequency associated with the frequency modulation signal and that of the low-frequency conversion color signal.

The recording signals of the video signal and the sound signal are mixed in the mixer 12 and is fed via a recording amplifier 20 to magnetic heads 21a-21b respectively having the different azimuth angles, which in turn record the signals on the magnetic tape 22. The magnetic tape 22 is drawn from the video cassette 84 stored in the cassette storage 80 and is then guided through tape guides 51, 51 such that the tape 22 is retained between a capstan 24 and a pinch roller 25 so as to be fed in a predetermined direction. The capstan 24 is driven at a constant speed by a tape drive circuit 23.

A video camera system controller 26 supplies, based on instruction signals from the record button 27 and other operation buttons 45-47, predetermined control instruction signals to the tape drive circuit 23, a head drive circuit 50, and other sections of the video camera unit 3

The optical system of the still camera unit 4 includes a master lens 28 disposed in a front surface of the body 2. Following the master lens 28, there are arranged an iris 36, a shutter 30, and a roll film 31 in a light path of an incident light of an object from the master lens 28.

The roll film 31 of this embodiment is a 135-type silver-halide type of photographic film which is supplied from a film supply reel 33 and is wound on a take-up spool 32 by a predetermined length thereof by means of a sprocket 38 to wind the film 31. The sprocket 38 is driven by a film wind driver 39. After the shooting operation is completed, the supply reel 33 is driven by a film rewind driver 43 so as to be rewound on the supply reel 33.

The still camera system controller 41 supplies, based on instruction signals from the shutter release button 42, the strobe ON/OFF button 44, and other operation buttons 45-47 and data from the AF sensor 57 and the EE sensor 58, predetermined instruction signals to the shutter driver 34, the film wind driver 39, the film rewind driver 43, a lens move section 54, an iris driver 40, and a strobe light controller 56. The still camera system controller 41 is also connected to the video camera system controller 26 to control the film wind driver 39 and the film rewind driver 43 in response to a signal from the video camera system controller 26, which will be described later.

The AF sensor 57 and the EE sensor 58 are arranged to be exposed from the body 2. The AF sensor 57 and the EE sensor 58 respectively measure a distance between the apparatus and an object and a brightness of the object so as to deliver the respective measured data to the still camera system controller 41.

The still camera system controller 41 feeds an instruction signal to the lens move section 54 depending on the data of the distance between the apparatus and the object supplied from the AF sensor 57, which causes the lens move section 54 to adjust a position of the master lens 28.

In addition, the still camera system controller 41 supplies an instruction signal to the iris driver 40 according to the data of the brightness of the object fed from the EE sensor 58. The iris driver 40 accordingly adjusts the magnitude of the opening of the iris 36 and at the same time controls an open period of time for which a shutter 30 is to be kept opened. Furthermore, the still camera system controller 41 outputs an instruction signal to the strobe light controller 56 depending on the instruction signal from the strobe ON/OFF button 44 and the data from the EE sensor 58. The strobe light controller 56 controls an emission of a light of the strobe light 55 in response to an instruction signal from the still camera system controller 41.

The optical view finder 70 is configured with an objective lens 72, an ocular lens 74, and a reticle 76 each arranged in a cylinder and is used to confirm an object field when effecting a shooting operation by means of the video camera unit 3 and the still camera unit 4. On the reticle 76 of the optical view finder 70, there is indicated, for example, a bright frame used to determining a range of an object scene to be shot by the video camera unit 3 and the still camera unit 4.

Next, a description will be given of operations of the camera constituted as described above.

First, the operation of shooting a movie picture will be described.

When the operator depresses the record button 27 after confirming an object scene through the optical view finder 70, the video camera system controller 26 sends predetermined control instruction signals to the tape drive circuit 23 and the head drive circuit 50. The tape drive circuit 23 in turn drives the capstan 24 to feed the magnetic tape 22, whereas the head drive circuit 50 drives the head.

As a result, a video signal attained as an image through the CCD 6 is fed through the amplifier 7, the preemphasis circuit 8, and the clamp circuit 9 to the frequency modulator 10 so as to be therein transduced into a recording signal, which is then supplied via the high-pass filter 11 to the mixer 12. On the other hand, the sound signal produced from the microcapsule 14 in the microphone 13 is fed via the AGC circuit 17 to the frequency modulator 18 so as to be therein transduced into a recording signal, which is then delivered via the band-pass filter 19 to the mixer 12. The video signal and the sound signal are mixed in the mixer and thereafter the resultant signal is supplied via the recording amplifier 20 to the magnetic heads 21a–21b and is thereby recorded on the magnetic tape 22.

On the other hand, when shooting a still picture, the operator first presses the strobe ON/OFF button 44. The still camera system controller 41 then sends an instruction signal to the strobe controller 56, which accordingly protrudes the strobe lamp 55 from the body 2 in a state where a strobe light can be emitted. The strobe controller 56 includes a main capacitor, not shown, which is beforehand charged to a capacitance capable of emitting a light.

Next, when the operator depresses the shutter button 42, the still camera system controller 41 supplies predetermined instruction signals to the lens move section 54 and the iris controller 40 in response to the data from the AF sensor 57 and the EE sensor 58 so as to set the magnitude of the opening of the iris and an open period of time for which the shutter 30 is to be kept opened and thereafter to open and then to close the shutter 30. At the same time, an instruction signal is also delivered to the strobe controller 56, which in turn discharges the electric charges accumulated in the main capacitor to cause a light emission of the strobe lamp 55.

After the shutter is opened and then closed, the still camera system controller 41 outputs a control instruction signal to the film wind driver 39, which accordingly causes the sprocket 38 to rotate. As a result, the roll film 31 is wound.

When a frame of the roll film 31 is wound, a wind detect circuit, not shown, detects the completion of the film wind operation and then sends a signal of the completion to the still camera system controller 41. On receiving the wind completion signal from the detect circuit, the still camera system controller 41 transmits an instruction signal to the strobe controller 56, which in response thereto starts accumulating electric charges from a power supply in the main capacitor. The end of the charging operation is notified to the operator by arranging a neon tube or the like in the optical system of the finder 70.

When the main capacitor of the strobe controller 56 is completely charged up, if the operator depresses the shutter button 42 again, similar to the operation above, the position of the master lens 28 is adjusted, the magnitude of the opening of the iris and the open period of time of the shutter 30 are established, and thereafter the shutter is opened and then closed. At the same time, the strobe lamp 55 is caused to emit a light.

When the roll film 31 is completely used up and hence a film change is required, the operation of the film wind driving section 39 to drive the sprocket 38 is disabled; consequently, the still camera system controller 41 issues an instruction signal to the film rewind driving section 43, which in turn drives the film supply reel 33 to rewind the film 31 thereon.

Incidentally, in a case where a still picture is desired to be taken by the still camera unit 4 while shooting a movie picture by the video camera unit 3, a signal representing an operation to shoot a movie picture is supplied from the video camera system controller 26 to the still camera system controller 41. On receiving the signal, the still camera system controller 41 causes the shutter to open and then close in order to accomplish a still picture shooting operation as described above and thereafter, however, does not deliver any control instruction signal to the film wind driving section 39. As a consequence, the film wind driver 39 does not wind the film 31, namely, the sound of an operation to wind the film 31 is not caused and hence is not recorded as a noise in the shooting of a movie picture.

Furthermore, in a case where after a still picture is shot by opening and then by closing the shutter 30, the film 31 is finished and is required to be replaced, the still camera system controller 41 recognises a signal from the video camera system controller 26 indicating that a video picture shooting operation is in process and therefore does not issue a control instruction signal to the film rewind driver 43. Consequently, the film rewind driver 43 does not rewind the film 31, namely, the sound of an operation to rewind the film 31 is not caused and hence is not recorded as a noise in the shooting of a movie picture.

According to the embodiment, as described above, since the video camera unit 3 and the still camera unit 4 are integrally structured in a body 2 comprising a housing or a cabinet, a movie picture and a still picture can be shot by a single apparatus. Furthermore, when the record, REC button 27 and the shutter button 42 are depressed, both shooting operations can be achieved. Since the REC button 27 and the shutter button 42 are arranged in the proximity of each other, the operator can easily shoot the movie and still pictures.

Because the apparatus includes means for automatically winding a film 31, the operator can shoot the movie and still pictures only by depressing the REC button 27 and the shutter button 42, which furthermore unnecessitates an operation to rewind the film 31 after the shooting operation thereof is completed. Moreover, since the strobe light 55 is provided, a shooting operation can be effected with a light emitted therefrom.

Furthermore, while shooting a movie picture by the video camera unit 3, the film 31 of the still camera unit 4 is controlled to be neither wound nor rewound, which consequently prevents the sounds associated with the winding and rewinding operations of the film 31 from being recorded as the noise in an operation to shoot a movie picture.

Incidentally, in the embodiment above, after the cartridge of the roll film 31 is installed on the side of the film supply reel 33, for each still picture shooting, a frame of the film 31 is wound on the side of the take-up reel 32. When the film 31 is entirely used up for the exposure thereof, the film is rewound in the cartridge on the supply reel side 33. However, this operation may be effected as follows, namely, immediately after the cartridge of the film 31 is installed on the side of the take-up reel 32, the entire film 31 is completely wound up on the take-up reel; thereafter, for each still picture shooting, the film is wound in the cartridge on the take-up reel 32 in a frame-by-frame fashion.

In this case, the still camera system controller 41 achieves a control to prevent, during a movie picture shooting operation, the film 31 immediately after the installation thereof from being wound on the supply reel 33. Moreover, in this case, when the film 31 is entirely used up in the shooting operation, the film 31 need not be rewound on the supply reel 33.

Although the still camera unit 4 of this embodiment employs a silver-halide type of photographic film, the still camera unit 4 may be of an instant photograph type or an electronic still camera type recording a video signal on a magnetic disk.

According to the present invention, since during a movie picture shooting by means of the video camera unit, the still camera unit is prevented from driving the film, the noise due to the film driving operation cannot be recorded in the movie picture shooting operation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A camera capable of shooting simultaneously both a movie picture and a still picture comprising:
    a still camera unit for shooting an object scene so as to record a still picture thereof on a film;
    a video camera unit for shooting an object scene so as to record a movie picture thereof on a video tape;
    film wind means including a motor for automatically winding said film after shooting said still picture; and
    control means for controlling an operation of said film wind means during an operation of said video camera unit;
    said still camera unit being allowed to shoot a still picture when said video camera unit is shooting a movie picture;
    said control means preventing said film wind means from winding said film while said video camera unit is shooting a movie picture whereby noise generated during the winding of said film is prevented from being recorded on said video tape.

2. A camera in accordance with claim 1, wherein
    said video camera unit and said still camera unit are contained in the same housing; and
    said video camera unit and said still camera unit include respective imaging optical systems arranged in a substantially horizontal direction for a shooting operation.

3. A camera in accordance with claim 1, further comprising film rewind means for rewinding said film when said film is finished.

* * * * *